June 24, 1924.
C. STEENSTRUP
1,498,893
METHOD OF MANUFACTURING PACKINGS
Filed Oct. 1, 1921
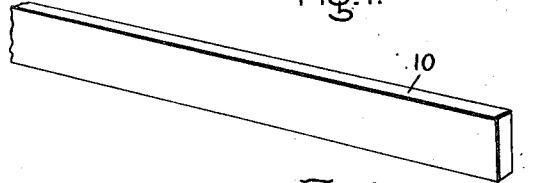
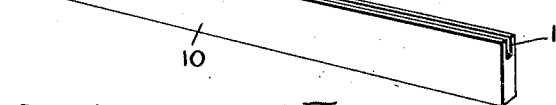
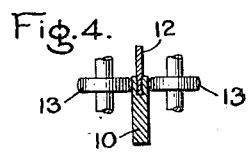
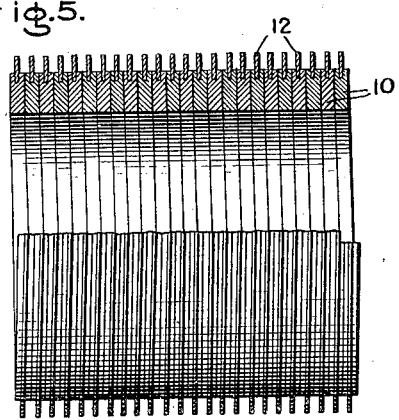
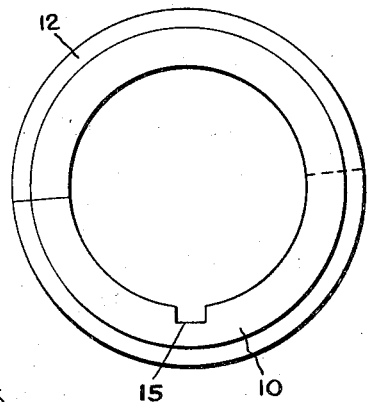
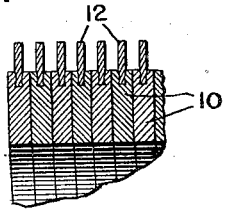
Inventor:
Christian Steenstrup
by Albert G Davis
His Attorney.

Patented June 24, 1924.

1,498,893

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING PACKINGS.

Application filed October 1, 1921. Serial No. 504,816.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Packings, of which the following is a specification.

The present invention relates to packings of the so-called labyrinth type, used to prevent leakage between relatively rotating members and has for its object to provide an improved method of manufacturing packings or packing elements of this general type.

For a consideration of what I believe to be novel and my invention, attention is directed to the accompanying description and the claims appended thereto.

In the drawing, Fig. 1 is a perspective view of a strip of material used in carrying out my method; Fig. 2 is a view similar to Fig. 1 illustrating a step in carrying out my invention, wherein the strip of Fig. 1 is provided with a longitudinally extending slot; Fig. 3 is a perspective view of metallic ribbon used in carrying out my invention, the ribbon forming packing teeth in a completed structure; Fig. 4 is a detail view illustrating certain steps used in carrying out my invention and a means for performing them; Fig. 5 is a side elevation partly in section of a completed packing which has been manufactured in accordance with my method; Fig. 6 is an end view of the packing shown in Fig. 5; and Fig. 7 is a detail sectional view on a large scale illustrating the completed packing.

In carrying out my invention, I take a continuous strip of material 10 of suitable width and thickness and of any desired or the required length as shown in Fig. 1 and cut a continuous longitudinally extending slot 11 in one face as shown in Fig. 2. Slot 11 may be cut with any suitable tool and is of a width and depth to receive an edge of a metallic ribbon 12, shown in Fig. 3, which is to form the packing teeth. The ribbon 12 comprises a thin, continuous strip of suitable metal, such as Monel metal, of a width so that when one edge is embedded in slot 11, the other edge projects a distance beyond the surface of strip 10 to form packing teeth of the desired depth.

Having provided a continuous length of slotted strip as shown in Fig. 2 and ribbon as shown in Fig. 3 I mount the ribbon on the strip with one edge in slot 11 as shown in Figs. 4 and 5. The ribbon may be fed into slot 11 by means of any suitable tool and as a continuous operation, and after being fed into the slot the strip 10 is passed between a pair of rollers 13 as shown in Fig. 4 which serves to squeeze together the sides of slot 11 and tightly grip or fasten the edge of ribbon 12 in the slot. It will be seen that I now have a continuous strip of packing material which comprises in substance a base carrying a projecting tooth and from which completed packings may be made.

To form a packing to go on a shaft, for example, I take a continuous length of the packing material as shown in Fig. 4 and wind it spirally with the packing ribbon 12 on the outside. It may be wound in any suitable way such as by winding it around a mandril, and is wound to form convolutions of the desired diameter. After the spiral has been formed the convolutions are squeezed together tightly and fastened in a temporary manner by spot welding or by other suitable means. As many convolutions may be used as is necessary to form a packing member of the desired length.

The convolutions of strip 10 are then permanently united to each other and the ribbon 12 permanently united to strip 10 by fusion of metal such as by brazing, welding, soldering or the like. Preferably I unite them by copper brazing in the presence of hydrogen. I then have a unitary structure in which the convolutions are firmly united to each other and the ribbon firmly united to them. If found desirable I may unite the ribbon to strip 10 by fusion of metal prior to forming or winding it into a spiral.

After the parts have been thus united, the inside of the cylinder formed may be finished to diameter, and slotted as indicated at 15 in Fig. 6. It may then be keyed to a shaft in the usual manner.

As will be seen from the enlarged view, Fig. 7, the material at the sides of slot 11 is squeezed in tightly against the sides of ribbon 12, being more or less embedded therein. This brings the materials into close engagement so that when united by fusion of metal a firm union takes place. Preferably, I provide grooves 16 along one or both sides of strip 12 into which the material which forms the sides of slot 11 may be squeezed so as to give a strong connection.

I may or may not provide the groove 16 as found desirable, the essential thing being that the edge of the ribbon be tightly squeezed into the groove prior to the winding and brazing operations.

By varying the thickness of strip 10 it will be seen that I can bring packing teeth 12 any desired distance apart. Ordinarily, for the most satisfactory packing it is desirable that the packing teeth be thin and close together. By my improved method, I can make the packing teeth of as thin material and bring them as close together as desired. It will be noted that the convolutions of the strip 10, after they have been united, form a carrying member or support for the packing teeth 12. It is therefore unnecessary to provide any other form of support. This means that the packing can be manufactured very expeditiously and at a low cost.

The strip 10 may be formed of steel for example which unites by fusion of metal in a most satisfactory manner and it will be noted that by the arrangement shown the parts to be brazed together are of like materials except in the case of the ribbon 12, which has already been tightly squeezed into slot 11. Furthermore stresses on the ribbon are much less than those between the convolutions of strip 10 themselves. Where the most firm union is required, therefore, I have a like metal to metal contact.

It will be understood that the strip packing material as shown in Fig. 4 may be used in manufacturing various types of packings or packing elements.

In accordance with the provisions of the patent statutes, I have described the principle of operation of my invention, together with the particular method which I now consider to represent the best manner for carrying it out, but I desire to have it understood that the particular method disclosed is only illustrative and that the invention may be carried out with such modifications as come within the scope of the appended claims.

What I claim as new and desire to secure by Letters Patent of the United States, is:—

1. The method of manufacturing a packing element which comprises taking a strip of material, mounting a ribbon edgewise thereon, and then winding the strip with the ribbon thereon spirally.

2. The method of manufacturing a packing element which comprises taking a strip of material having a slot extending longitudinally thereof, fastening a ribbon edgewise in the slot, and winding the strip and ribbon spirally.

3. The method of manufacturing a packing element which comprises taking a strip of material, mounting a ribbon thereon edgewise, winding the strip with the ribbon thereon spirally, and fastening the convolutions of the strip and the ribbon together by fusion of metal.

4. The method of manufacturing a packing element which comprises taking a strip of material having a slot extending longitudinally thereof, fastening a ribbon edgewise in the slot, winding the strip and ribbon spirally and fastening the convolutions of the strip and the ribbon together by fusion of metal.

5. The method of manufacturing a packing element which comprises taking a strip of material having a slot extending longitudinally thereof, mounting a ribbon edgewise in the slot, squeezing the edges of the slot against the ribbon, and winding the strip and ribbon spirally.

6. The method of manufacturing an element for use in making packings which comprises taking a strip having a continuous longitudinally extending slot in one edge, feeding ribbon edgewise into the slot, and passing the strip between rollers to squeeze the edges of the slot into engagement with the ribbon.

7. The method of manufacturing a packing member which comprises taking a strip of material having a slot extending longitudinally thereof, mounting a ribbon edgewise in the slot, passing the strip between rollers to squeeze the edges of the slot into engagement with the ribbon, winding the strip and ribbon spirally and uniting the convolutions of the strip and the ribbon by fusion of metal.

8. The method of manufacturing a packing member which comprises taking a strip of material having a slot extending longitudinally thereof, mounting a ribbon edgewise in the slot, winding the strip and ribbon spirally, squeezing the convolutions together and temporarily fastening them to form a cylinder, and then uniting the convolutions to each other by fusion of metal.

In witness whereof, I have hereunto set my hand this 30th day of September, 1921.

CHRISTIAN STEENSTRUP.